(12) United States Patent
Rodems

(10) Patent No.: US 7,226,174 B2
(45) Date of Patent: Jun. 5, 2007

(54) APPARATUS FOR MOUNTING A DATA/VIDEO PROJECTOR IN A PORTABLE ENCLOSURE

(76) Inventor: Michael George Rodems, 253 Stonehenge Dr., Orchard Park, NY (US) 14127

( * ) Notice: Subject to any disclaimer, the term of this patent is extended or adjusted under 35 U.S.C. 154(b) by 274 days.

(21) Appl. No.: 11/126,786

(22) Filed: May 11, 2005

(65) Prior Publication Data

US 2006/0256304 A1   Nov. 16, 2006

(51) Int. Cl.
*G03B 21/14* (2006.01)
*H04N 5/64* (2006.01)
*A47B 81/06* (2006.01)

(52) U.S. Cl. .......................... 353/119; 353/70; 348/794; 312/10.1

(58) Field of Classification Search ............... 353/119, 353/122, DIG. 5, 74, 76, 94, 69, 70; 348/794, 348/789; 434/310, 309, 314; 248/689–693, 248/582–584, 125.1, 125.2, 157, 419–422; 312/10.1, 249.1, 249.2, 249.7, 305, 350; 396/2, 5, 12, 144, 146, 419, 421, 428
See application file for complete search history.

(56) References Cited

U.S. PATENT DOCUMENTS

| | | | | |
|---|---|---|---|---|
| 3,912,385 A * | 10/1975 | Stokes et al. | ................. | 353/94 |
| 5,640,215 A * | 6/1997 | Catta | ........................... | 348/789 |
| 6,315,308 B1 * | 11/2001 | Konopka | ................. | 280/47.35 |
| 6,485,144 B1 * | 11/2002 | Liao | ........................... | 352/243 |
| 6,616,283 B1 * | 9/2003 | Takano et al. | ................. | 353/74 |
| 7,134,756 B2 * | 11/2006 | Drucker et al. | ............... | 353/77 |
| 2005/0018092 A1 * | 1/2005 | Park et al. | .................. | 348/787 |
| 2006/0092387 A1 * | 5/2006 | Feigel et al. | ................. | 353/94 |

* cited by examiner

*Primary Examiner*—W. B. Perkey
*Assistant Examiner*—Andrew Sever

(57) ABSTRACT

The invention relates to an apparatus for securely mounting a data/video projector in a portable enclosure with an adjustable mounting surface for the projector. The invention includes an apparatus that allows for easy adjustment of pitch angle of the projector to align the projector's image with the desired projection surface. The invention keeps the projector securely mounted even while in use, thereby deterring theft. The apparatus is designed to be mounted to any standard rack rail system. Standard security screws are utilized to deter theft.

1 Claim, 3 Drawing Sheets

APPARATUS FOR MOUNTING A DATA/VIDEO PROJECTOR IN A PORTABLE ENCLOSURE

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of audio visual technology and more specifically to an apparatus for mounting a data/video projector in a portable enclosure.

Data/video projectors have become a significant tool in teaching at all levels from K-12 through higher education. Meeting facilities as well as corporate offices also have utilized data/video projectors to display computer presentations, internet content, and various types of video presentations. Even video conferencing and distance learning facilities utilize data/video projectors.

Typically, a data/video projector is utilized by mounting it permanently to a fixed surface such as a ceiling, or it is placed on a table or cart. This invention relates to the use of a data/video projector used with a cart, more specifically a portable enclosure. Generally in this application, the projector is placed on a shelf with nothing to secure it into place. Adjustment of the image to match the desired location on the projection surface is easily done horizontally by turning or moving the portable enclosure to the left or right. Vertical adjustment of the image is more difficult. When the projector is placed on a shelf, the adjustable legs of the projector must be used to vertically adjust the image, but the projector is not secure in its place. Theft of the projector while the data/video projector is not attended, or damage while transporting the portable enclosure is a concern. Being able to securely fasten the projector to the portable enclosure is a valuable feature. With the invention, the projector is securely mounted to the mounting plate, which is securely mounted in the portable enclosure, and the projector is safe from theft and movement during transportation. An additional challenge is to provide a means for easily adjusting the pitch of the mounting plate to allow quick and easy vertical adjustment of the projected image.

This invention accomplishes these challenges by providing a secure mounting surface that is able to be adjusted easily and quickly from the outside of the enclosure. The portable enclosure does not need to have lockable doors to maintain the security of the projector. The elimination of the need for lockable doors provides added security and allows for quicker setup.

In the past a variety of AV carts existed. They consisted of open shelves made of metal or plastic that would provide a flat surface to place the data/video projector on so that it could be used in the classroom or presentation room. The cart is easily moved into place. This same cart would transport the projector along with other equipment needed during the presentation.

Konopka et al., U.S. Pat. No. 6,315,308 describes a rolling metal enclosure that includes locking doors and a shelf that pivots like a seesaw. The projector is used by opening a locked door, and adjusting the pitch by loosening two knobs on either side and then tightening them after the desired pitch is achieved. To secure the projector after use, the enclosure's doors must be closed and then locked.

AV carts with open shelves do not provide any security for the equipment. The pitch angle of the projector must be adjusted to match the desired screen surface by utilizing the adjustable legs built into the projector. These are sometimes difficult to use. After much use, many tend to become broken.

The projector shelf disclosed in Konopka et al., U.S. Pat. No. 6,315,308 has significant drawbacks. Setup of the projector for use requires unlocking the enclosure's door to gain access to the shelf. The pitch angle adjustment requires the user to loosen the tightening knobs, rock the projector to the desired angle, and then while holding the projector into position with one hand, tighten the knobs with the other. This also must be done while watching the image on the projected surface. During use, the projector is exposed to theft since it is deployed from the security of the locked enclosure. When finished the reverse sequence of events are required to store the projector in the locked enclosure.

BRIEF SUMMARY OF THE INVENTION

The primary object of the invention is to provide an adjustable mount for the projector so that the projector's image can be aligned with the screen.

Another object of the invention is to provide secure mounting of projector to prevent theft or dislodging during transport.

Another object of the invention is to enable quick vertical adjustment of the image thereby saving setup time.

A further object of the invention is easy vertical adjustment of the image with one hand while simultaneously adjusting the horizontal orientation of the portable enclosure with the other.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an apparatus for mounting a data/video projector in a portable enclosure comprising: An adjustable mounting surface for said projector to be fastened to utilizing standard projector mounting screws, a secure hinge attaching said adjustable mounting surface to a secure fixed surface, mounting holes on said fixed surface that fit AV industry standard rack rails, a line or cable that is affixed to said adjustable mounting surface and led first vertically and then through the outer wall of said enclosure for easy access to adjustment, and a line locking device that secures the line in place and thereby secures the pitch of the adjustable mounting plate.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
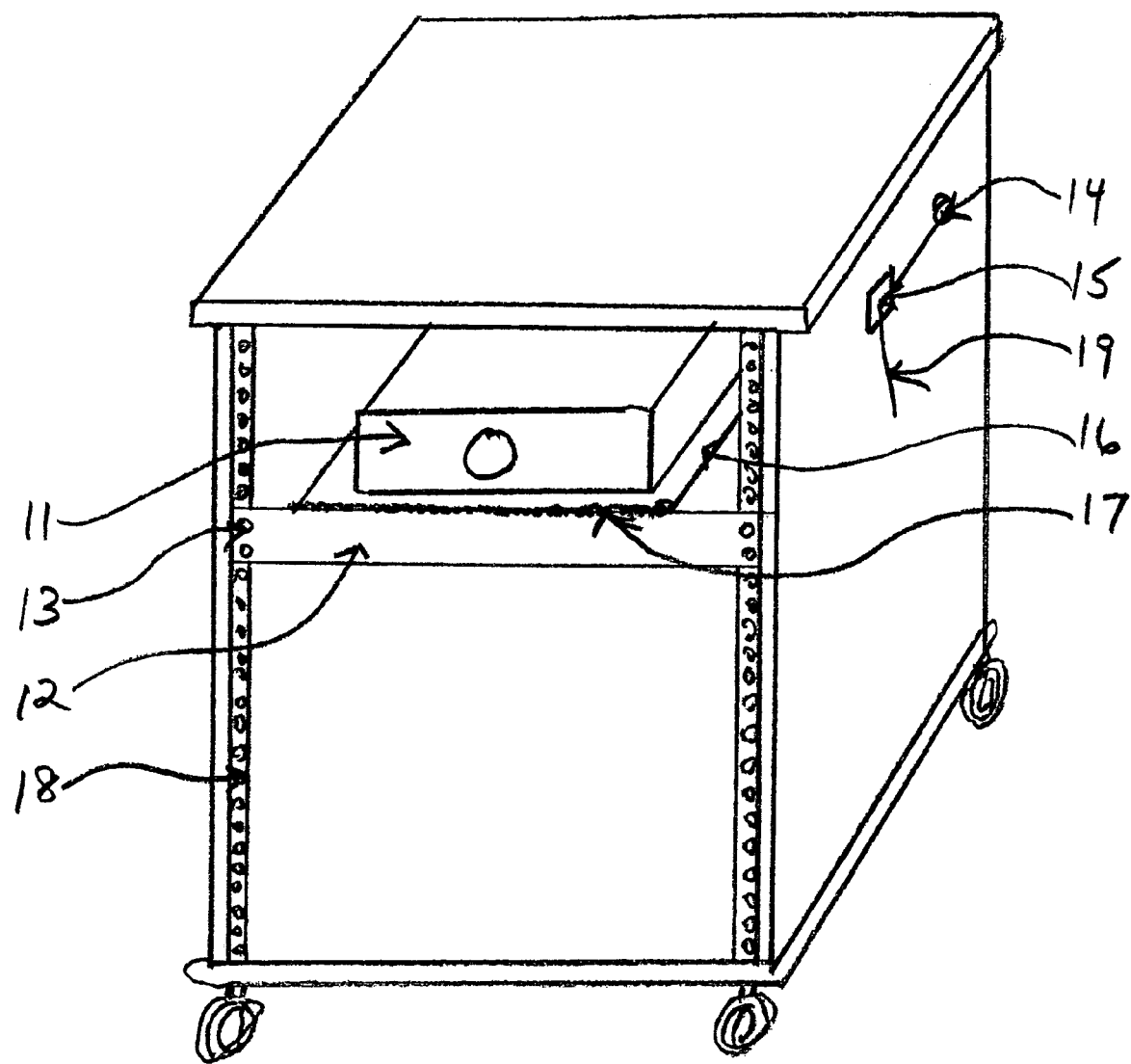
FIG. 1 is a perspective view of the invention supporting a projector in a mobile enclosure.
Figure 2:
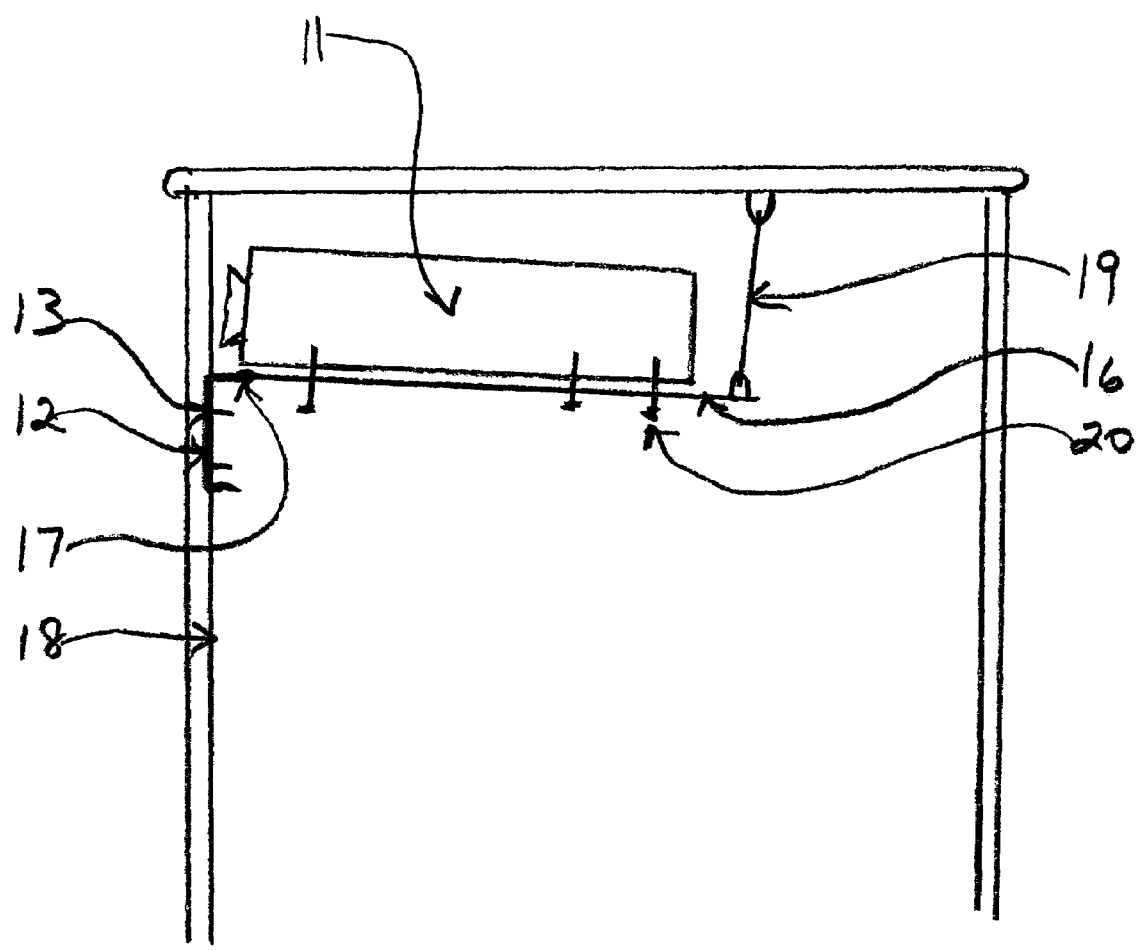
FIG. 2 is a cross section of the invention supporting a projector in the enclosure.

Turning to the drawings, in FIG. 1 the invention is shown inside a mobile enclosure supporting a data/video projector 11. The projector 11 is securely fastened to the adjustable surface 16 generally with screws designed to fit the mounting holes in the underside of the projector 11. The adjustable surface 16 is attached to the fixed surface 12 by a hinge 17 allowing the adjustable surface 16 to change its angle of pitch. The fixed surface 12 may be attached to standard industry rack rails 18 by standard security screws 13. Adjustment of the pitch angle is done by pulling/easing the adjustment line 19 which comes out of the enclosure through an aperture 14 and through a securing cleat or clamp 15.

In FIG. #2, the cross section of the apparatus shows the projector 11 securely fastened to the adjustable surface 16 by standard machine screws 20 that are inserted through holes in the adjustable shelf and into the mounting holes of the projector 11. The vertical surface 12 is attached with standard security screws 13 into the standard industry rack rails 18. The hinge 17 allows the adjustable shelf 16 to accomodate the desired pitch angle for the projector 11 to properly align with the screen surface. A line or cable 19 is affixed to the adjustable shelf 16 and run vertically to support the back position of the adjustable surface 16. The line 19 is easily adjusted in length so that gravity along with a secured position of the line supports the rear of the adjustable shelf 16 while the front is secured by the hinge 17. Pitch adjustment of any increment may be induced by adjusting the line 19.

Figure 3:
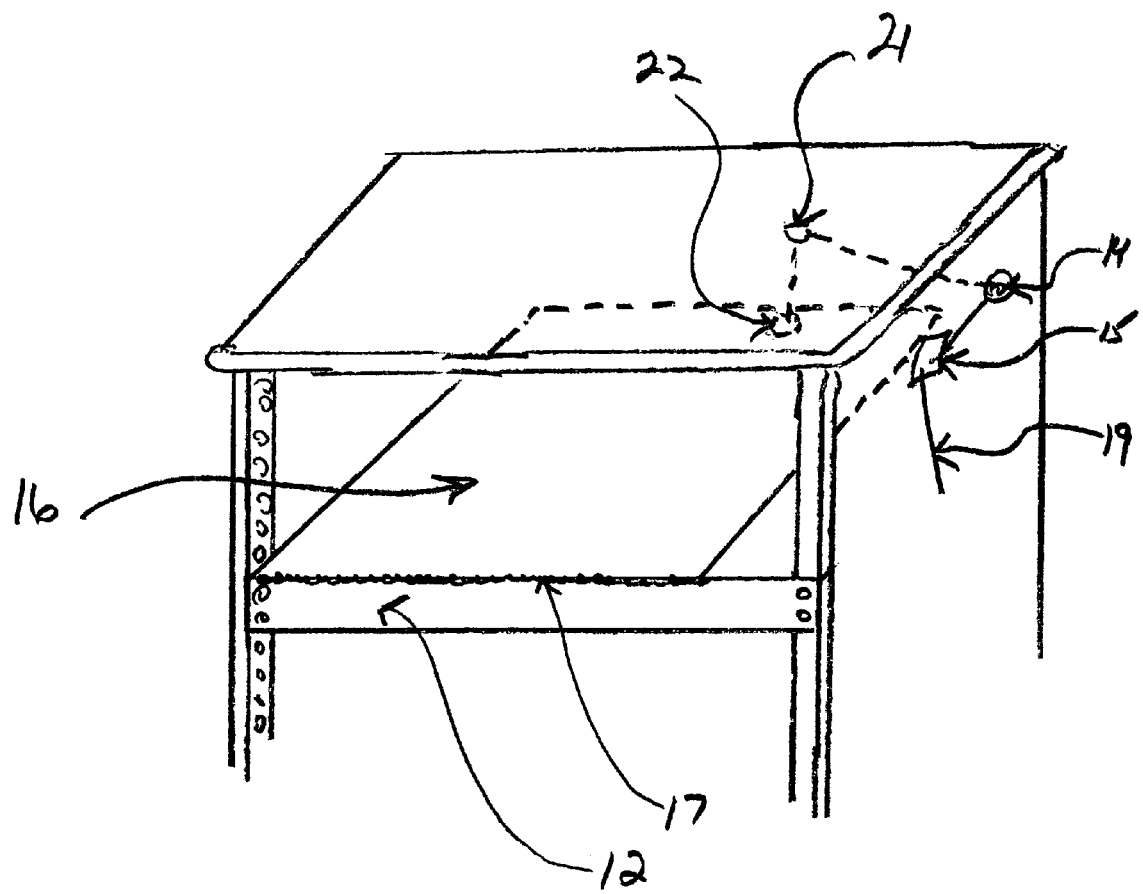
FIG. 3 is another perspective view of the invention in the enclosure.

In FIG. 3 the adjustable surface 16 is shown with the hinge 17 securing the front edge of the adjustable surface 16 to the fixed surface 12 that is securely mounted to the enclosure. The rear of the adjustable surface is raised or lowered by adjusting the line/cable 19 from a convenient location outside of the enclosure. This line is easily secured by a cleat or clamp 15 located near the aperture 14 that the line 19 runs through to the inside of the enclosure. The line is affixed to either the adjustable surface 16 or a ring or hook 21 mounted directly above so as to produce a hoist effect on the adjustable surface 16.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus for mounting a data/video projector in an enclosed portable enclosure comprising:
    an adjustable mounting surface for said projector to be fastened to utilizing standard projector mounting screws;
    a secure hinge attaching said adjustable mounting surface to a secure fixed surface;
    mounting holes on said fixed surface that fit AV industry standard rack rails;
    a line or cable that is affixed to said adjustable mounting surface and led first vertically and then through the outer wall of said enclosure for easy access to adjustment; and
    a line locking device that secures the line in place and thereby secures the pitch of the adjustasble mounting plate.

* * * * *